United States Patent
Afonso Perez et al.

(10) Patent No.: US 8,654,783 B2
(45) Date of Patent: Feb. 18, 2014

(54) METHOD FOR CHANNEL SWITCHING AND DEVICE FOR COMMUNICATION

(75) Inventors: Mauro Afonso Perez, Graz (AT); Nikolaus Ribic, Frohnleiten (AT)

(73) Assignee: AMS AG, Unterpremstaetten (AT)

( * ) Notice: Subject to any disclaimer, the term of this patent is extended or adjusted under 35 U.S.C. 154(b) by 277 days.

(21) Appl. No.: 12/732,166

(22) Filed: Mar. 25, 2010

(65) Prior Publication Data
US 2010/0246540 A1 Sep. 30, 2010

(30) Foreign Application Priority Data
Mar. 25, 2009 (EP) .................................. 09004295

(51) Int. Cl.
*H04L 12/43* (2006.01)
(52) U.S. Cl.
USPC ............................................................ 370/458
(58) Field of Classification Search
USPC .................. 370/458, 375, 436–437
See application file for complete search history.

(56) References Cited

U.S. PATENT DOCUMENTS

| 5,541,954 | A | 7/1996 | Emi | |
|---|---|---|---|---|
| 6,958,991 | B1 * | 10/2005 | Raaf | 370/348 |
| 8,005,046 | B2 * | 8/2011 | Salmenkaita et al. | 370/330 |
| 2006/0098715 | A1 | 5/2006 | Amano | |

FOREIGN PATENT DOCUMENTS

| EP | 0 884 858 | 6/1998 |
|---|---|---|
| EP | 1 990 928 A1 | 11/2008 |
| WO | WO 01/15354 | 3/2001 |

OTHER PUBLICATIONS

European Search Report, EP 09004295, Aug. 17, 2009; Applicant provided.*
Krishnamoorthy, A. et al.: "Frequency Semi-Selective Scheduling for a DFT-SOFDM based Uplink" 2008 IEEE 68th Vehicular Technology Conference (VTC 2008-Fall) IEEE Piscataway, NJ, USA, Sep. 21, 2008.

* cited by examiner

*Primary Examiner* — Hassan Phillips
*Assistant Examiner* — Omeed D Rahgozar
(74) *Attorney, Agent, or Firm* — McDermott Will & Emery LLP

(57) ABSTRACT

A method for channel switching comprising the steps: establishing (10) an active communication in a channel ch(m), checking (11) if the communication at an actual timeslot t(n) is successful, if checking (11) if the communication at the actual timeslot t(n) is successful, keeping the communication using the channel ch(m) for a next timeslot t(n+1) and repeating checking (11) if the communication at the actual timeslot t(n) is successful, if checking (11) if the communication at the actual timeslot t(n) is not successful, initiating a selection of a next channel ch(m+1). Further a device for communication is presented.

11 Claims, 7 Drawing Sheets

METHOD FOR CHANNEL SWITCHING AND DEVICE FOR COMMUNICATION

RELATED APPLICATIONS

This application claims the priority of European application no. 0900425.3 filed Mar. 25, 2009, the entire content of which is hereby incorporated by reference.

FIELD OF THE INVENTION

The present invention is related to a method for channel switching, and to a device for wireless communication.

BACKGROUND OF THE INVENTION

Devices communicating by means of wireless technology run the risk of encountering interference in environments where other wireless technologies are in use. One of the possibilities to overcome this issue is to switch to an undisturbed communication channel, for example by switching the frequency used. Such frequency hopping systems face the challenge to re-synchronize a transmitting and a receiving device.

In frequency hopping, a signal is transmitted on a bandwidth considerably larger than the frequency content of the original information. There exist so-called spread spectrum techniques which employ pseudo-random numbers to determine and control the spreading pattern of the signal across the allowed bandwidth. Examples of these spread spectrum techniques are frequency hopping spread spectrum, FHSS, which is used e.g. by Bluetooth, direct sequence spread spectrum, DSSS, which is used e.g. by Zigbee, and time hopping spread spectrum, THSS, which is used in second-generation mobile cellular networks. Also combinations of these techniques are possible.

All of these techniques use a different strategy to achieve resynchronization of transmitting and receiving device after switching the communication channel. For instance, the approach in Bluetooth is that the transmitting device uses all the channels in a fixed period of time. The communication channel is changed for every time slot. The receiving device retrieves the channel of the transmitting device by picking a random channel, staying in that channel, and listening for valid data. This takes time and increases current consumption in the devices involved.

SUMMARY OF THE INVENTION

It is an object of the invention to provide an improved method for channel switching, as well as an improved device for wireless communication.

In one exemplary embodiment, a method for channel switching comprises the following steps:
establishing an active communication in a channel $ch(m)$,
checking if the communication at an actual time slot $t(n)$ is successful,
if checking if the communication at an actual time slot $t(n)$ is successful, keeping the communication using the channel $ch(m)$ for the next time slot $t(n+1)$ and repeating checking if the communication at the actual time slot $t(n)$ is successful,
if checking if the communication at an actual time slot $t(n)$ is not successful, initiating a selection of a next channel $ch(m+1)$. Thereby, the method operates in one of a first and a second mode, wherein in the second mode, a newly assigned channel is kept for at least two times slots.

When an active communication between a transmitting and a receiving device is established in the channel $ch(m)$, which means that transmitting and receiving device are using the same communication channel $ch(m)$ and are successfully transmitting and receiving data using the channel $ch(m)$, the method according to a disclosed embodiment starts. In every actual time slot $t(n)$, it is checked whether the communication in this time slot $t(n)$ is successful. If the communication is successful, the channel $ch(m)$ is kept for the next time slot $t(n+1)$. If the communication is not successful, the selection of the next channel $ch(m+1)$ is initiated.

Obviously, the method only initiates the selection of the next channel $ch(m+1)$ when the communication is not successful, in other words, when the channel $ch(m)$ is corrupted. This adaptive channel switching reduces the need for resynchronization and thereby reduces the time spent on resynchronization, too. As the method relies on using only one channel at a time, the underlying system can be regarded as a narrow-band system.

Assuming a time slot based system for the method for channel switching, the actual time slot $t(n)$ is regarded as the effective, or current time slot in which the communication takes place. The next time slot $t(n+1)$ is the time slot following immediately the actual time slot $t(n)$. The channel $ch(m)$ is characterized by a frequency which is defined in a communication system to transfer data between devices. For each communication system, one or more of these channels are defined adding up to a list or a table of channels. The next channel $ch(m+1)$ is the channel that is selected from this list of channels according to a pre-defined procedure known by the devices communicating or by using a random generator, when the channel $ch(m)$ gets corrupted.

Repeating checking if the communication at the actual time slot $t(n)$ is successful means starting the next time slot $t(n+1)$ and therefore, the next time slot $t(n+1)$ becoming the actual time slot $t(n)$.

In another exemplary embodiment, initiating the selection of the next channel $ch(m+1)$ comprises the following steps:
testing if a value identifying the next channel $ch(m+1)$ is available,
if testing if a value identifying the next channel $ch(m+1)$ is available proves yes, switching to the next channel $ch(m+1)$ identified by the value and repeating checking if the communication at the actual time slot $t(n)$ is successful,
if testing if a value identifying the next channel $ch(m+1)$ is available proves no, continuing with an examination step.

There are two possibilities for the generation of a value identifying the next channel $ch(m+1)$, namely generating a new value in every time slot and generating a value only when needed. In the first approach, where the value is generated periodically, the switching to the next channel $ch(m+1)$ is executed immediately. In the second approach, where the value identifying the next channel $ch(m+1)$ is provided upon request, the examination step is run through.

In the second approach, where the value for the next channel $ch(m+1)$ is generated only when needed, if a failure is detected at the time slot $t(n)$ and the communication at the preceding time slot $t(n-1)$ was successful, the value for the next channel is generated, and switching to the next channel $ch(m+1)$ is realized for the next time slot $t(n+1)$.

The two mentioned possibilities increase the flexibility of the method, thereby leaving room for improvements in different directions regarding reliability of the communication channel and current consumption.

In another exemplary embodiment, the examination step comprises:

checking if the communication at a preceding time slot $t(n-1)$ was successful, if checking if the communication at the preceding time slot $t(n-1)$ was successful produces yes, generating the value identifying the next channel $ch(m+1)$, switching to the next channel $ch(m+1)$ identified by the value and repeating checking if the communication at the actual time slot $t(n)$ is successful, if checking if the communication at the preceding time slot $t(n-1)$ was successful produces no, continuing with an inspection step.

In another exemplary embodiment, the inspection step comprises:

inspecting whether the channel $ch(m)$ was used for a number of preceding time slots between time slot $t(n-x)$ and time slot $t(n-1)$, if inspecting whether the channel $ch(m)$ was used for the number of preceding time slots between time slot $t(n-x)$ and time slot $t(n-1)$ results in yes, generating the value for the next channel $ch(m+1)$, switching to the next channel $ch(m+1)$ identified by the value and repeating checking if the communication at the actual time slot $t(n)$ is successful, if inspecting whether the channel $ch(m)$ was used for the number of preceding time slots between time slot $t(n-x)$ and time slot $t(n-1)$ results in no, repeating checking if the communication at the actual time slot $t(n)$ is successful.

A newly assigned channel thereby is kept for at least two time slots, even in the case that the communication is not successful. In the case where the number x equals one, it is consequently guaranteed that at the second time slot transmitting and receiving device are using the same channel. They are resynchronized.

The preceding time slot $t(n-1)$ is the time slot immediately before the actual time slot $t(n)$. Following this principle, time slot $t(n-2)$ is the time slot preceding time slot $t(n-1)$ and so on.

In another exemplary embodiment, the number of preceding time slots between time slot $t(n-x)$ and time slot $t(n-1)$ comprises a number equal to or greater than one.

The number of time slots in which the channel $ch(m)$ is kept for communication can be extended to any number equal or bigger than two. Thereby, optimizations regarding a tradeoff between power consumption and reliability can be adapted individually.

In another exemplary embodiment, switching to the next channel $ch(m+1)$ comprises assigning the value to the next channel $ch(m+1)$ and using the next channel $ch(m+1)$ in the next time slot $t(n+1)$.

By this, the method for channel switching ensures that synchronization, meaning transmitting and receiving devices using the same channel, is recovered after two time slots. This very fast synchronization time reduces drastically the number of re-transmissions needed to recover data communication. Average current consumption and communication time can be improved significantly.

In another embodiment example, testing if a value identifying the next channel $ch(m+1)$ is available is performed before checking if the communication at the actual timeslot $t(n)$ is successful.

Optionally, the method for channel switching is also adapted to be used in a system with one channel dedicated for transmitting and another channel dedicated for receiving. In this case, the method is applied to each channel separately.

In one exemplary embodiment, a device for communication comprises means for sending and receiving, a list of communication channels $ch[0 \ldots M]$, a generator, and means for executing the method for channel switching. The channels from the list of communication channels $ch[0 \ldots M]$ are to be accessed via the means for sending and receiving. The generator is adapted to supply a value for a channel $ch(m)$ from the list of communication channels $ch[0 \ldots M]$. The means for executing the method for channel switching act as a function of a value supplied by the generator and depending on the quality of the channel $ch(m)$.

Using the means for sending and receiving, the generator and the means for executing the method for channel switching, the device is able to communicate with another like device over a communication link using the channels from the list of communication channels $ch[0 \ldots M]$. It is guaranteed that a communication channel is switched only when needed, and that re-synchronization of the devices communicating is achieved after a configurable number of time slots.

A device can be a transmitter or receiver or both. The quality of the channel $ch(m)$ is determined by the device when checking if the communication at an actual time slot $t(n)$ is successful. The communication is not successful if either transmitted data is not correctly received, or if transmitted data is correctly received but a corresponding acknowledgement is not.

In another exemplary embodiment, the generator is adapted to be programmable to operate in a first or in a second mode.

In an alternative solution, the generator is not programmable and operates only in one of the two modes.

This enhances the flexibility of the device.

In another exemplary embodiment, in the first mode of the generator, the value for the next channel $ch(m+1)$ is supplied periodically.

This means that the value for the next channel $ch(m+1)$ is generated for every time slot in a time slot-based system.

In another exemplary embodiment, in the second mode of the generator, the value for the next channel $ch(m+1)$ is supplied upon request.

In the second mode of the generator, the value for the next channel $ch(m+1)$ is supplied only when the channel $ch(m)$ gets corrupted. In this mode, a communication channel is used for at least two time slots to assure re-synchronization of transmitting and receiving device.

In another exemplary embodiment, the generator is designed to supply the value for the next channel $ch(m+1)$ using a predefined procedure.

The predefined procedure comprises, for instance, a predefined fix or pseudo-random table or any predefined algorithm. As transmitting and receiving devices rely on the same predefined procedure to generate the value for the next channel $ch(m+1)$, it is assured that the same value is produced on both devices.

BRIEF DESCRIPTION OF THE DRAWINGS

The text below explains the invention in detail using exemplary embodiments with reference to the drawings in which like numerals or symbols are used for like elements.

DETAILED DESCRIPTION OF THE DRAWINGS

Figure 1:
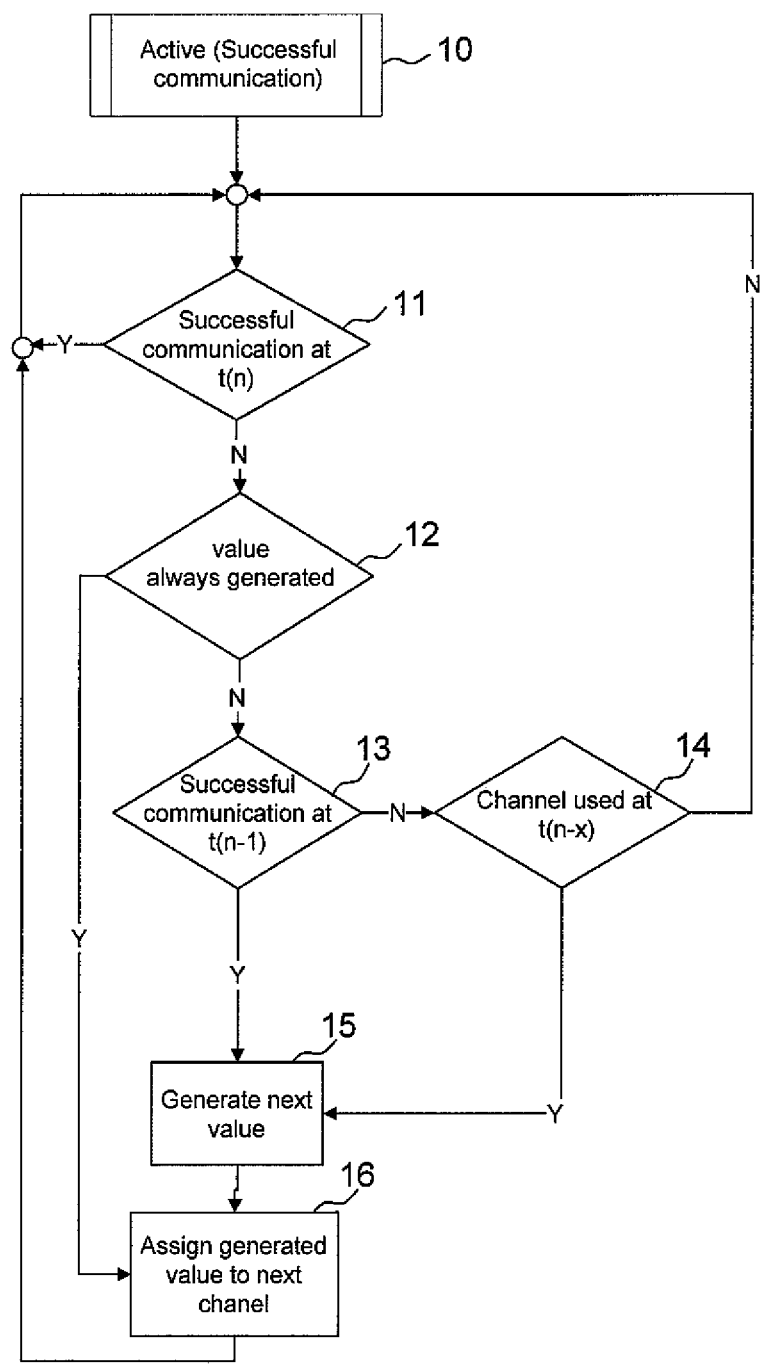
FIG. 1 shows an exemplary embodiment of a method for channel switching.

FIG. 1 shows an exemplary embodiment of a method for channel switching. The method comprises the following steps:

establishing 10 an active communication in a channel ch(m), checking 11 if the communication at an actual time slot t(n) is successful, if checking 11 is successful, keeping the communication using the channel ch(m) for a next time slot t(n+1) and repeating checking 11, if checking 11 is not successful, testing 12 if a value identifying a next channel ch(m+1) is available, if testing 12 proves yes, switching to the next channel ch(m+1) identified by the value and repeating checking 11, if testing 12 proves no, checking 13 if the communication at a preceding time slot t(n−1) was successful, if checking 13 produces yes, generating 15 the value identifying the next channel ch(m+1), switching to the next channel ch(m+1) identified by the value and repeating checking 11, if checking 13 produces no, inspecting 14 whether the channel ch(m) was used for a number of preceding time slots between time slot t(n−x) and time slot t(n−1), if inspecting 14 results in yes, generating 15 the value for the next channel ch(m+1), switching to the next channel ch(m+1) identified by the value, and repeating checking 11, and if inspecting 14 results in no, repeating checking 11.

Switching to the next channel ch(m+1) comprises assigning 16 the value to the next channel ch(m+1) and using the next channel ch(m+1) in the next time slot t(n+1).

Following the method for channel switching described above, as long as the communication at the actual time slot t(n) proves successful in checking 11, which means that data as well as acknowledgements are transmitted correctly using the channel ch(m), that channel ch(m) is used for further communication. As soon as the channel ch(m) gets corrupted, in the case that either data or acknowledgements or both are not transmitted correctly, the method initiates switching to the next channel ch(m+1). There are two possibilities for generating the value for the next channel ch(m+1), first, the value is generated in every time slot, and second, the value is generated only when the communication channel is changed. Therefore, before switching the channel, it first has to be checked in the step testing 12, if the value identifying the next channel ch(m+1) is available. If the value is generated continuously, it is assigned to the next channel ch(m+1) and the next channel ch(m+1) is used in the next time slot t(n+1).

Therefore, if a failure in the communication channel ch(m) is detected at the actual time slot t(n), the channel for the next time slot t(n+1) is changed to the next channel ch(m+1).

In the other case, if a failure is detected at the actual time slot t(n) and the value for the next channel ch(m+1) is provided upon request, the communication channel is switched immediately if the communication at the preceding time slot t(n−1) was successful as assured in checking 13. The inspecting 14 ensures that a newly assigned channel is kept for at least two time slots even in the case that no successful communication takes place at the next time slot t(n+1). Consequently, it is guaranteed that at the second time slot, the communicating devices are using the same channel and are synchronized.

In normal operation, it is sufficient to choose the number one for the number x resulting in using the same channel ch(m) for two time slots. For other usages, it might be desirable to increase the number x to a number greater than one, which leads to using the same communication channel ch(m) for at least three time slots.

Depending on the mode of generating the value identifying the next channel ch(m+1), the method guarantees a synchronization of communicating devices at least after two time slots. This results in high reliability and a reduction in power consumption.

Figure 2:
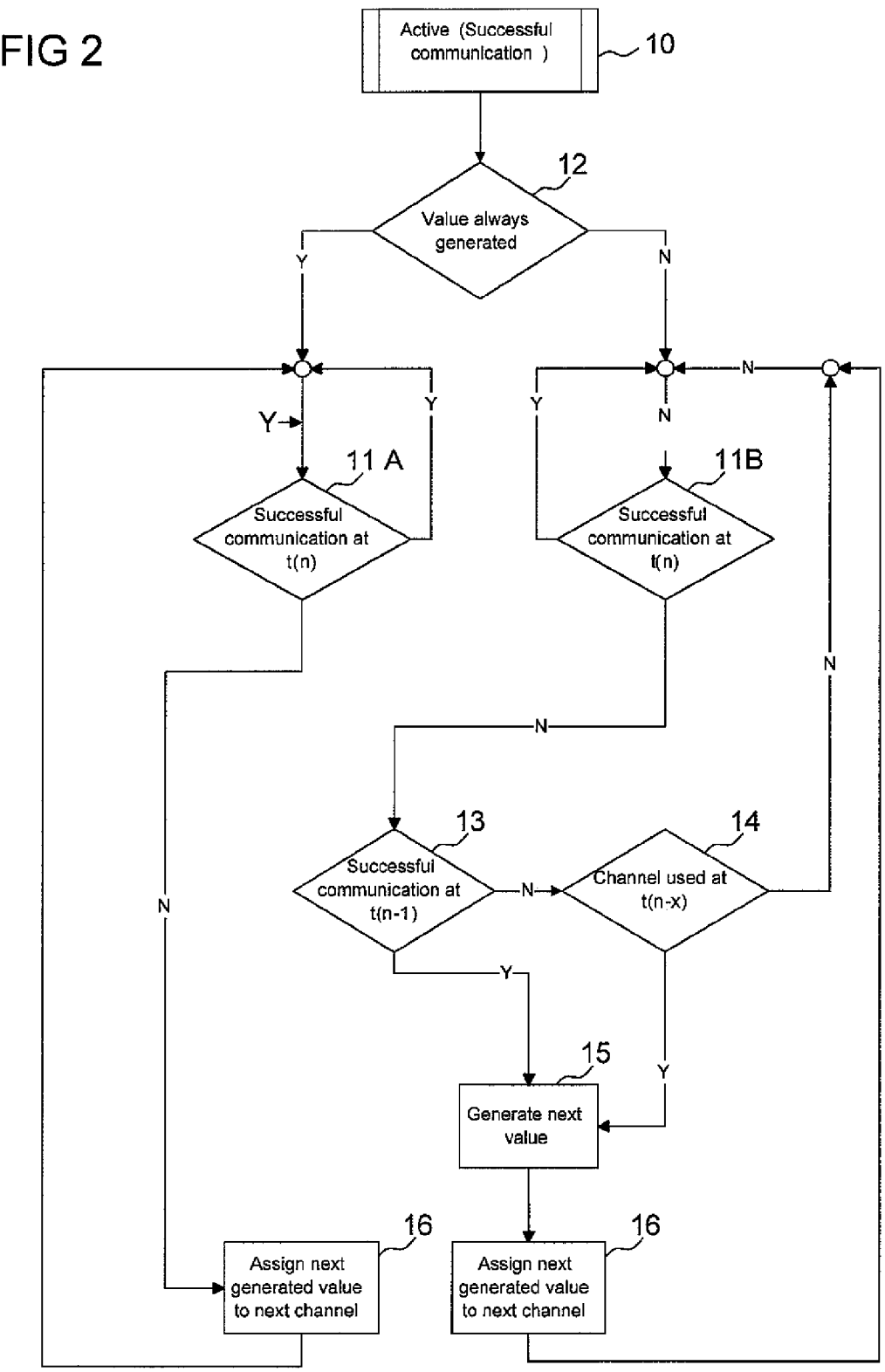
FIG. 2 shows another exemplary embodiment of a method for channel switching.

FIG. 2 shows another exemplary embodiment of a method for channel switching. This example embodiment corresponds to the embodiment of FIG. 1 except that the sequence of the steps checking 11 if the communication at the actual timeslot t(n) is successful and testing 12 if the value identifying the next channel ch(m+1) is available is inverted. Consequently, when an active communication is established 10, the testing 12 if the value identifying the next channel ch(m+1) is available is performed once. For each case, if the testing 12 proves yes, meaning that the value identifying the next channel is always generated, and if the testing 12 proves no, meaning that the value identifying the next channel is generated only when needed, the checking 11 if the communication at the actual timeslot t(n) is successful is executed.

In the case that the value identifying the next channel is always generated and a communication error is detected at the actual timeslot t(n), switching to the next channel ch(m+1) is initiated. The method continues with checking 11A if the communication at the actual timeslot t(n) is successful. This is depicted in the left hand branch of FIG. 2.

In the case that the value identifying the next channel is generated only when needed and a communication error is detected at the actual timeslot t(n) per checking 11B, checking 13 if the communication at the preceeding timeslot t(n−1) was successful is performed. The method continues as described above under FIG.1 after checking 13. After performing the switching to the next channel or if the inspecting 14 whether the channel ch(m) was used for a number of preceeding timeslots between t(n−x) and t(n−1) proves no, the method continues with checking 11B if the communication at the actual timeslot t(n) is successful. This is depicted in the right hand branch of FIG. 2.

Figure 3:
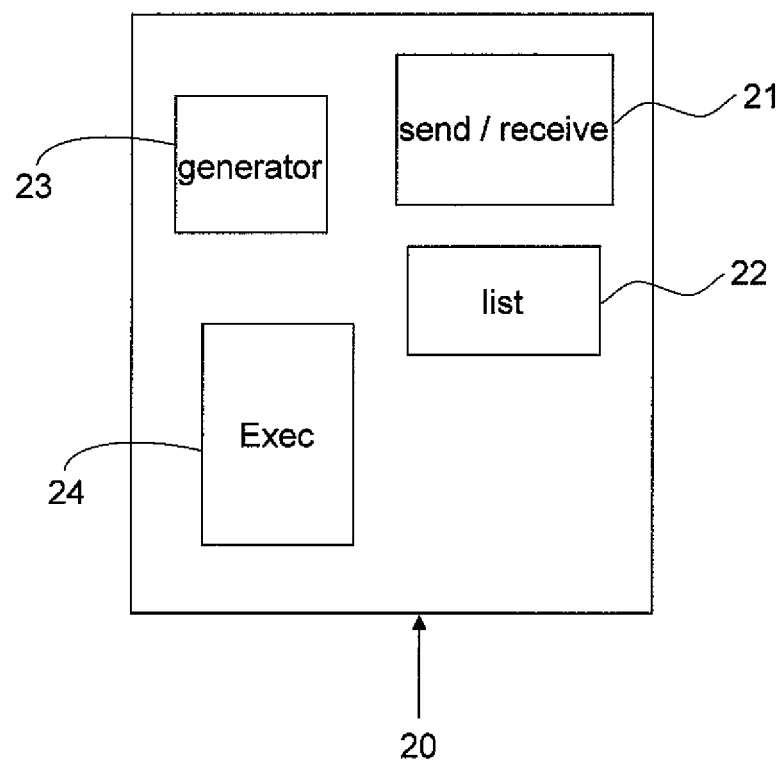
FIG. 3 shows exemplary an embodiment of a device for communication.

FIG. 3 shows an exemplary embodiment of a device for communication. The device 20 comprises means for sending and receiving 21, a list 22 of communication channels ch[0 . . . M], a generator 23, and means for executing 24 the above described method for channel switching. The channels on the list 22 can be accessed via the means for sending and receiving 21. The generator 23 is adapted to supply a value for a channel ch(m) from the list of communication channels ch[0 . . . M]. The method for channel switching is realized by the means for executing 24 depending on a quality of the channel ch(m) and as a function of a value supplied by the generator 23.

The device 20 can be realized, for example, as a mobile phone, portable phone, PCMCIA card, portable computing device, or handheld device. The means for sending and receiving 21 comprises, for example, antenna, baseband, and radio frequency equipment, as well as receiving and transmitting functionality. The list 22 of communication channels ch[0 . . . M] comprises a definition of a number of channels to be used in conjunction with the means for sending and receiving 21, and related numbering. A channel can, for instance, be defined as a frequency band which is used to transmit data. The means for executing 24 comprise, for example, a processor and storage.

The generator 23 is adapted to be programmable to operate in a first or in a second mode. In the first mode, the generator 23 supplies a value for the next channel ch(m+1) periodically in every time slot t(n). In the second mode, the generator 23 supplies the value for the next channel ch(m+1) upon request, which means when the communication channel ch(m) is corrupted. In both modes, the generator 23 supplies the value for the next channel ch(m+1) by using a predefined procedure. This procedure can be based on a predefined or pseudo-random table or on any other algorithm. The generator 23 can also be denoted as sequence generator.

In both modes, the communication channel ch(m) is kept for the communication at the next time slot t(n+1) in case the communication is successful at the actual time slot t(n).

In the first mode, if a failure is detected at the actual time slot t(n), the channel for communication in the next time slot t(n+1) is changed to the next channel ch(m+1). As the value identifying the next channel ch(m+1) is generated in every time slot, the channel can be switched immediately according to the predefined procedure in generator 23.

In the second mode, if a failure is detected at the actual time slot t(n) and the communication at the preceding time slot t(n−1) was successful, the channel for the communication at the next time slot t(n+1) is switched to the next channel ch(m+1). A newly assigned channel is kept for at least two time slots, even in case that the communication is not successful. Thereby, it is guaranteed in case that the number x is configured to two that at least in the second time slot transmitting and receiving device are synchronized on the same channel again.

In one implementation example, if a failure in the communication is detected at the actual time slot t(n), a communication error is introduced at the next time slot t(n+1). In case the transmitter detects a communication failure, meaning that an acknowledge is not received, at the actual time slot t(n), it triggers a communication failure at the next time slot t(n+1) by switching to the next channel ch(m+1). If the receiver does not detect a communication failure at the actual time slot t(n), it keeps using the same channel ch(m) for the next time slot t(n+1). At the next time slot t(n+1) a communication failure is detected and a communication failure is triggered by switching to the next channel ch(m+1). Therefore, the synchronization is recovered at the time slot t(n+2).

In case the receiver also detects a communication failure at the actual time slot t(n), it triggers a communication failure as well by switching to the next channel ch(m+1) at the next time slot t(n+1). In this case transmitting and receiving devices are already synchronized at time slot t(n+1).

This triggering of a communication failure ensures that both transmitting and receiving devices use the same channel in time slot t(n+2).

For the subsequent figures it is assumed that the number x is configured to two.

Figure 4A:
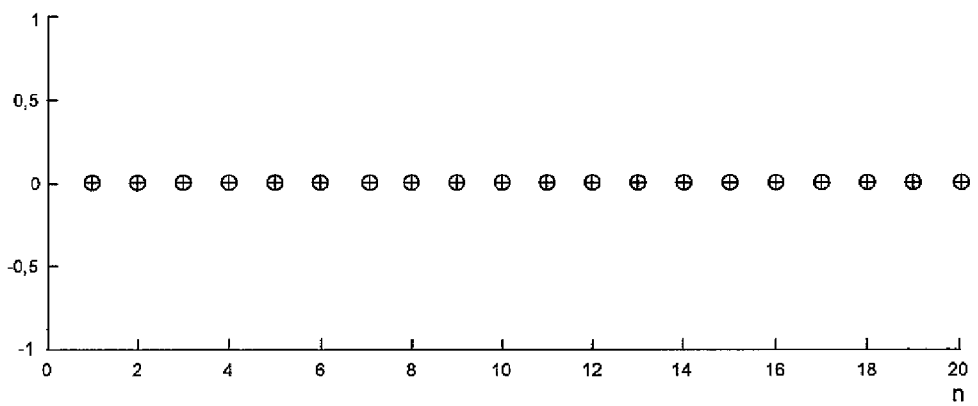
FIGS. 4A and 4B show exemplary graphs for a communication without errors using the disclosed method.
Figure 4B:
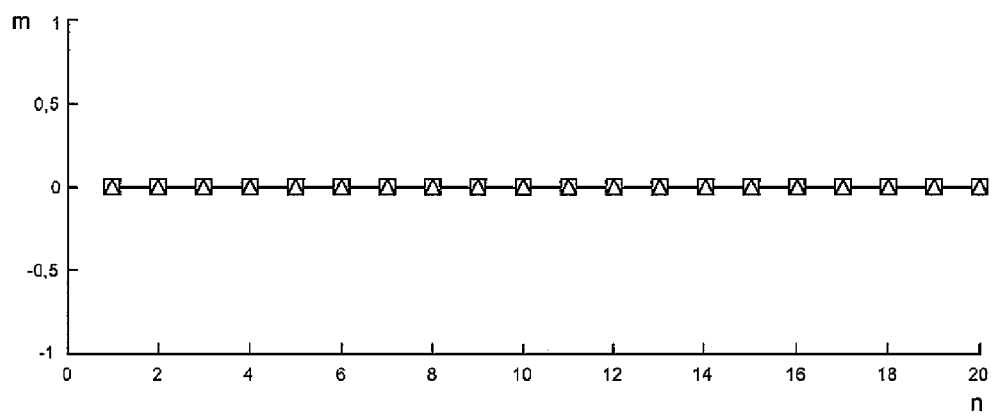

FIGS. 4A and 4B show exemplary graphs for a communication without errors using the method claimed. The diagram in FIG. 4A shows an error rate statistic for an ongoing communication. On the x-axis, the number n of time slots is represented. On the y-axis, the degree of probability of an error is depicted. Different symbols are used for different kinds of errors. A data error which occurs on the way from transmitter to receiver is marked with a star. A diamond identifies an acknowledgement error which occurs when an acknowledgement confirming correct receipt of data is not transmitted to the transmitter. A receiving error at the receiver is labeled with a circle. A receiving error at the transmitter is symbolized with a cross. It can be seen from the diagram that there are no receiving errors either at the receiver or at the transmitter. The error rate is zero.

The diagram of FIG. 4B shows the channel statistics appendant on the error rate statistics on top. The x-axis again represents the number n of time slots. On the y-axis, the number m of channels is depicted. A triangle marks the channel used by the receiver, a rectangle signifies the channel used by the transmitter. A line shows the channel difference between transmitter and receiver. Transmitter and receiver start in the channel with the number zero at a time slot t(1). As no errors occur in the communication, transmitter and receiver stay in the same channel throughout the communication. Therefore, the channel difference always is zero.

As the channel is not changed as long as the communication is successful, unnecessary channel switching is avoided. Consequently, power consumption is reduced.

Figure 5A:
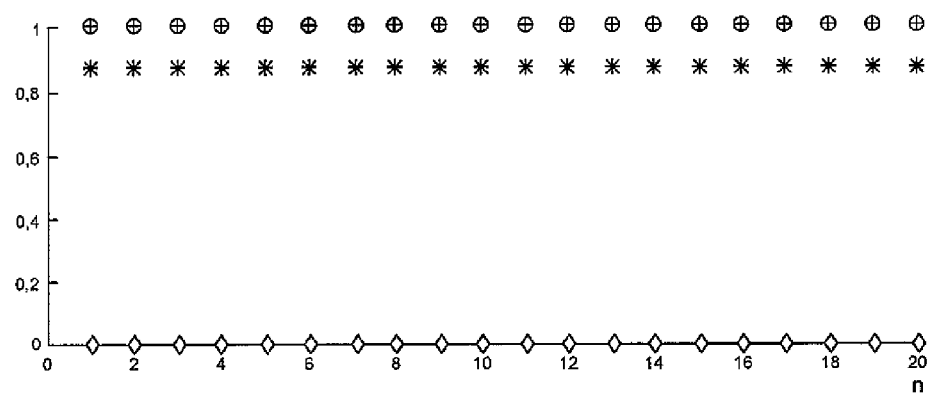
FIGS. 5A and 5B show exemplary graphs for a communication with 100% data errors using the disclosed method.
Figure 5B:
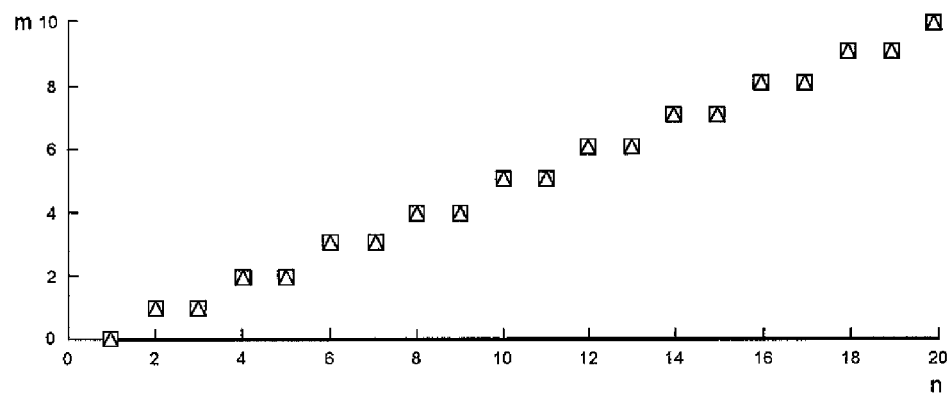

FIGS. 5A and 5B show exemplary graphs for a communication with 100% data errors. The same symbols as in FIGS. 4A and 4B are used in FIG. 5A, an error rate statistic is presented, and in FIG. 5B corresponding channel statistics are shown. 100% data errors, marked by the stars, means that in every time slot data is not received, leading to receiving errors at the receiver, marked with a circle. Communication from the transmitter to the receiver is not possible. Consequently, no acknowledgements are sent from receiver to transmitter, resulting in a receiving error on the transmitter side marked with a cross. For reasons of readability, the stars identifying data errors are presented below the circles and crosses. In reality, the stars should also be in the same place as the circles and crosses as the data error rate is 100%.

It can be seen from the channel statistics, that the communication channel is changed by the transmitting and the receiving device. After switching to the next channel, this channel is kept for the next time slot. Therefore, the channel used by transmitter and receiver is the same for every timeslot, the channel difference is zero as indicated by the thick line.

Figure 6A:
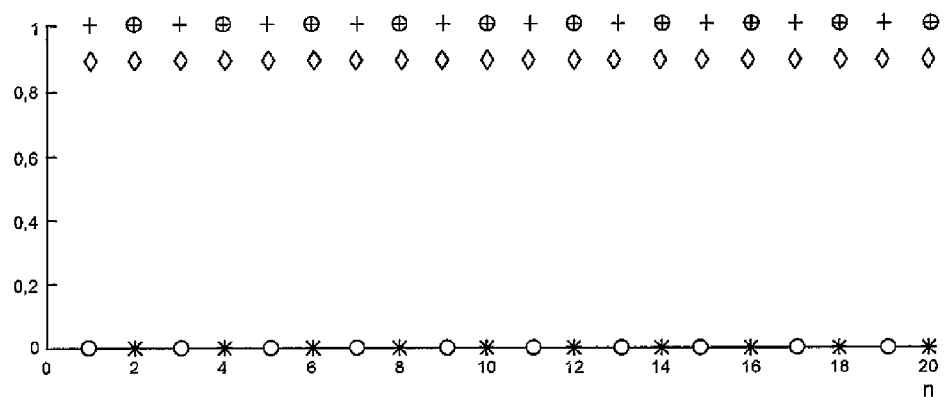
FIGS. 6A and 6B show exemplary graphs for a communication with 100% of acknowledgement errors using the disclosed method.
Figure 6B:
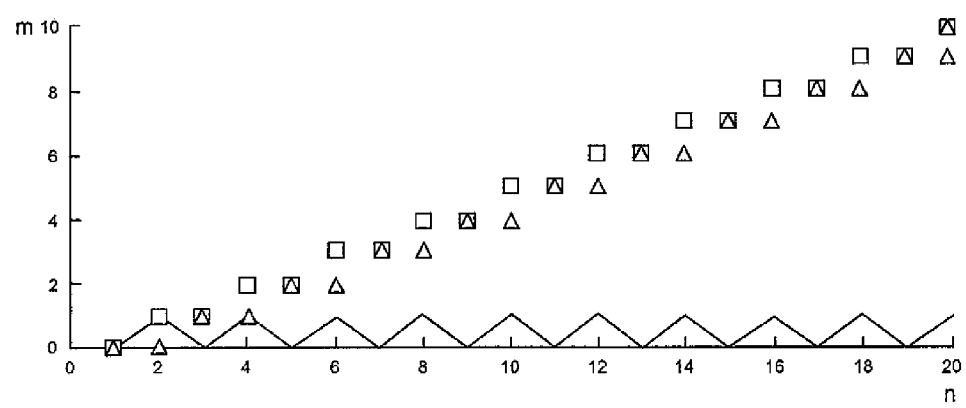

FIGS. 6A and 6B show exemplary graphs for a communication with 100% acknowledgement errors. The same symbols as in FIGS. 4A and 4B are used. In FIG. 6A, an error rate statistic is presented, and in FIG. 6B corresponding channel statistics are shown. In this case, data is correctly transmitted from transmitting device, and is correctly received by the receiving device, but the acknowledgements get lost.

As shown in the channel statistics, initially, the receiver stays in the same channel because it gets the data correctly. The transmitter does not receive the acknowledgment and changes to the next channel for the next time slot. During this time slot, transmitter and receiver do not use the same channel and consequently, the receiver does not get the data. The receiver then changes the channel for the next time slot. Since the transmitter, after changing the channel, stays two time slots in the same channel, the channel synchronisation is recovered again. The channel difference amounts to a maximum value of one as can be seen from the zigzag line.

Figure 7A:
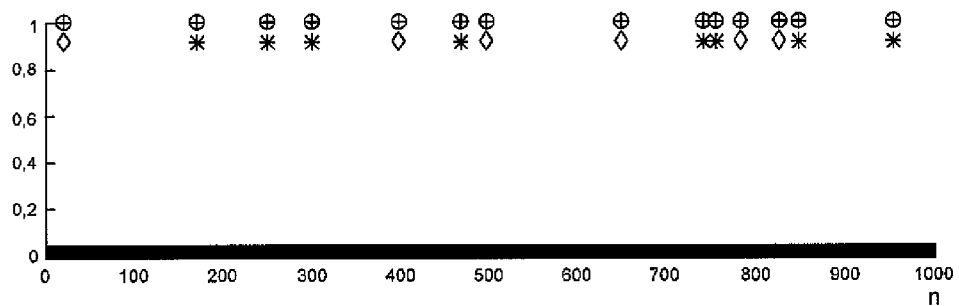
FIGS. 7A, 7B and 7C show exemplary graphs for a communication with 1% error ratio using the disclosed method.
Figure 7B:
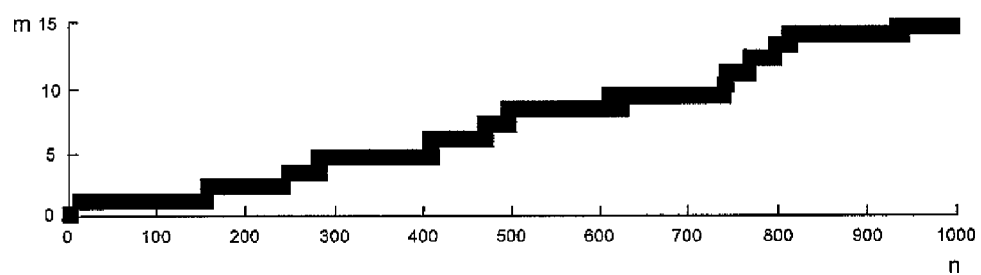
Figure 7C:
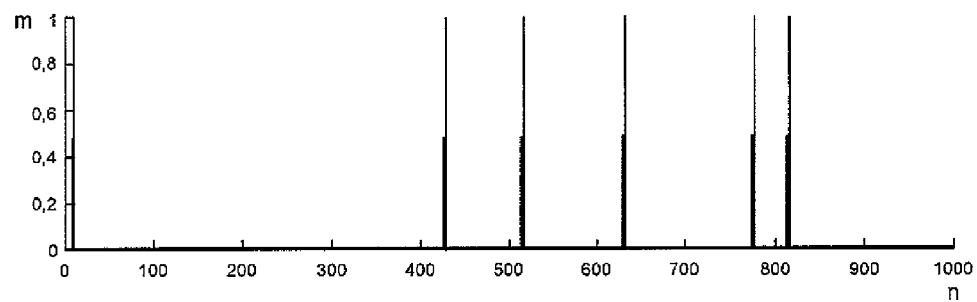

FIGS. 7A to 7C show exemplary graphs for a communication with 1% error ratio for data and acknowledgement transmission. In all three diagrams, 1000 time slots are presented. In FIG. 7A, the error rate statistics are depicted, using the same symbols as in the error rate statistics in FIGS. 4A and 4B. The 1% error ratio for data and acknowledgment transmission is represented by the stars and diamonds, respectively. The resulting receiving errors on receiver and transmitter side are marked with circles and crosses, respectively. For better readability not all the symbols are presented in the same place. Some symbols are presented below, but still represent the probability value one in the statistic.

The diagram in FIG. 7B comprises the channel statistics. When an error occurs, transmitting and receiving device change the channel.

In FIG. 7C, the channel difference is shown in a separate diagram. It can be seen, that the channel difference never exceeds one.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A method for channel switching comprising:
    assigning a channel ch(m) and establishing an active communication between at least two devices, wherein the communication is associated with transmitting and receiving at least one of data or acknowledgement messages in the channel ch(m);
    checking whether the communication at an actual timeslot t(n) is successful or not successful;
    if the communication at the actual timeslot t(n) is successful, keeping the communication using the channel ch(m) for a next timeslot t(n+1) and repeating checking whether the communication at the actual timeslot t(n) is successful or not successful;
    if the communication at the actual timeslot t(n) is not successful, initiating a selection of a next channel ch(m+1);
    inspecting whether the channel ch(m) was used for a number of preceding timeslots between timeslot t(n−x) and a preceding timeslot t(n−1);
    if inspecting whether the channel ch(m) was used for the number of preceding timeslots between timeslot t(n−x) and timeslot t(n−1) results in yes, generating a value identifying the next channel ch(m+1); and
    when operating in a mode whereby the value identifying the next channel ch(m+1) is supplied upon request, delaying switching to the next channel ch(m+1) for at least two time slots if the channel ch(m) is determined to have been newly assigned even if the channel ch(m) is determined to be corrupted.

2. The method for channel switching according to claim 1, wherein initiating the selection of the next channel ch(m+1) comprises:
    testing if the value identifying the next channel ch(m+1) is available;
    if testing if the value identifying the next channel ch(m+1) is available proves yes, switching to the next channel ch(m+1) identified by the value and repeating checking whether the communication at the actual timeslot t(n) is successful or not successful; and
    if testing if the value identifying the next channel ch(m+1) is available proves no, continuing with an examination.

3. The method for channel switching according to claim 2, wherein the examination comprises:
    checking whether the communication at timeslot t(n−1) was successful or not successful,
    if the communication at timeslot t(n−1) was successful, generating the value identifying the next channel ch(m+1), switching to the next channel ch(m+1) identified by the value and repeating checking whether the communication at the actual timeslot t(n) is successful or not successful; and
    if the communication at timeslot t(n−1) was not successful, continuing with the inspection the inspecting whether the channel ch(m) was used for the number of preceding timeslots between timeslot t(n−x) and timeslot t(n−1).

4. The method for channel switching according to claim 3, wherein the inspecting whether the channel ch(m) was used for the number of preceding timeslots between timeslot t(n−x) and timeslot t(n−1) further comprises:
    if inspecting whether the channel ch(m) was used for the number of preceding timeslots between timeslot t(n−x) and timeslot t(n−1) results in yes, switching to the next channel ch(m+1) identified by the value for the next channel ch(m+1) and repeating checking whether the communication at the actual timeslot t(n) is successful or not successful; and
    if inspecting whether the channel ch(m) was used for the number of preceding timeslots between timeslot t(n−x) and timeslot t(n−1) results in no, repeating checking whether the communication at the actual timeslot t(n) is successful or not successful.

5. The method for channel switching according to claim 1, wherein the number of preceding timeslots between timeslot t(n-x) and timeslot t(n−1) comprises a number greater than or equal to two.

6. The method for channel switching according to claim 2, wherein switching to the next channel ch(m+1) comprises assigning the value to the next channel ch(m+1) and using the next channel ch(m+1) in the next timeslot t(n+1).

7. The method for channel switching according to claim 2, wherein testing if a value identifying the next channel ch(m+1) is available is performed before checking whether the communication at the actual timeslot t(n) is successful or not successful.

8. A device for communication comprising:
    means for sending and receiving;
    a list of communication channels ch[O..M], the channels to be accessed via the means for sending and receiving;
    a generator to supply a value for a channel ch(m) from the list of communication channels ch[O..M]; and
    means for executing the method for channel switching according to claim 1 as a function of a value supplied by the generator and depending on a quality of the channel ch(m),
    wherein the generator is configured to be programmable to operate in a first mode or in a second mode, and
    wherein in the second mode switching to the next channel ch(m+1) is delayed for at least two time slots if the channel ch(m) is determined to have been newly assigned even if the channel ch(m) is corrupted.

9. The device for communication according to claim 8, wherein in the first mode of the generator, the value for the next channel ch(m+1) is supplied periodically.

10. The device for communication according to claim 8, wherein in the second mode of the generator, the value for the next channel ch(m+1) is supplied upon request.

11. The device for communication according to claim 8, wherein the generator is designed to supply the value for the next channel ch(m+1) using a predefined procedure.

* * * * *

UNITED STATES PATENT AND TRADEMARK OFFICE
CERTIFICATE OF CORRECTION

PATENT NO. : 8,654,783 B2
APPLICATION NO. : 12/732166
DATED : February 18, 2014
INVENTOR(S) : Mauro Afonso Perez et al.

Page 1 of 1

It is certified that error appears in the above-identified patent and that said Letters Patent is hereby corrected as shown below:

IN THE CLAIMS:

In Column 10, Line 5, Claim 3

Replace "with the inspection the inspecting whether", with --with the inspecting whether--.

In Column 10, Line 39, Claim 8

Replace "ch[O..M]", with --ch[0..M]--.

In Column 10, Line 42, Claim 8

Replace "ch[O..M]", with --ch[0..M]--.

Signed and Sealed this
Twenty-fourth Day of February, 2015

Michelle K. Lee
*Deputy Director of the United States Patent and Trademark Office*